D. UNTHANK,

Assignor of one-half to F. A. COFFIN.

Cultivator.

No. 9,607. Reissued March 15, 1881.

WITNESSES;
G. H. Remett
H. L. Aughinbaugh.

INVENTOR.
Daniel Unthank
Per E. Strink.
his
Attorney

N. PETERS, PHOTO-LITHOGRAPHER, WASHINGTON, D. C.

UNITED STATES PATENT OFFICE.

DANIEL UNTHANK, OF SPICELAND, ASSIGNOR OF ONE-HALF TO FRANCIS A. COFFIN, OF RICHMOND, INDIANA.

CULTIVATOR.

SPECIFICATION forming part of Reissued Letters Patent No. 9,607, dated March 15, 1881.

Original No. 222,550, dated December 9,1879. Application for reissue filed November 17, 1880.

*To all whom it may concern:*

Be it known that I, DANIEL UNTHANK, a citizen of the United States, residing at Spiceland, in the county of Henry and State of Indiana, have invented a new and useful Improvement in Adjustable Two-Horse Cultivators, of which the following is a specification.

My invention relates to improvements in adjustable two-horse cultivators in which parallel bars provided with double-jointed couplings at each end operate in conjunction with the frame to which the plow-standards are attached, also with the frame and crank-arms attached to the axle; and the objects of my improvements are, first, to provide a connection for the plows with the axle of the cultivator which will permit the plows to be moved laterally and vertically without changing their pitch; second, to afford facilities for the proper adjustment of the plows to any desired pitch to cause them to work deeper or shallower in the ground; and, third, to provide a means for adjusting the plows to work closer to or farther from the rows of plants and not change the pitch. I attain these objects by the mechanism illustrated in the accompanying drawings, in which—

Figure 1:
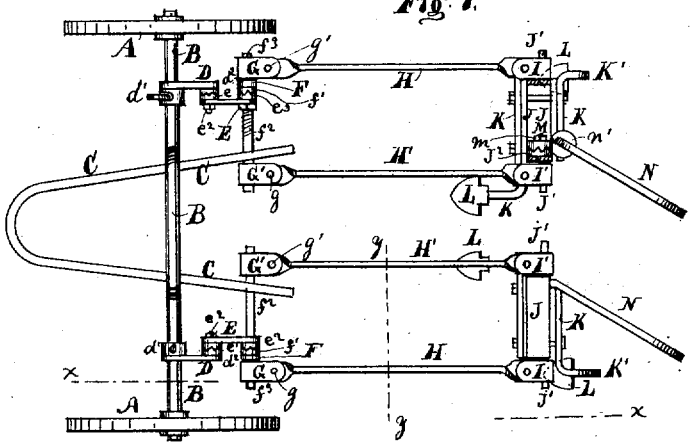
Figure 2:
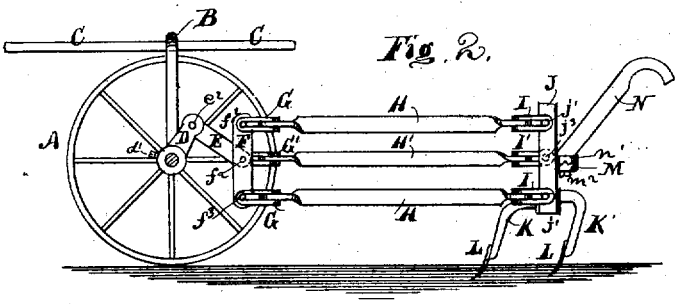
Figure 3:
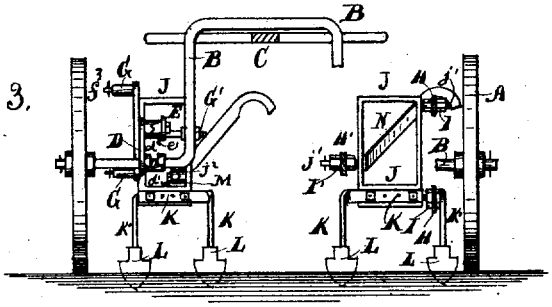

Figure 1 is a top view of the entire machine. Fig. 2 is a side elevation of the same, partially in section, through the line *x x;* and Fig. 3 is an end elevation, partially in section, through the line *y y* of Fig. 1.

Similar letters refer to similar parts throughout the several views.

A A are the cultivator-wheels, mounted and revolving on the axle B. The middle part of the axle B is bent or formed into an arch, so that it can pass over tall plants without injuring them.

To the upper part of the arch or bend of the axle B the rear end of the forked tongue C is attached, thus elevating the tongue so as to permit it to pass over plants without injuring them.

Upon the horizontal end parts of the axle B are placed crank-arms D, the hubs of which are secured to the axle by set-screws $d'$, by means of which the crank-arms may be turned up or down, and also adjusted laterally on the axle B, and made fast at any position required.

Upon the sides of the outer ends of the crank-arms D are formed notched plates $d^2$, which engage with the corresponding notched plates $e'$, formed upon the side of the forward ends of the connecting-bars E. The adjacent ends of the crank-arm D and the connecting-bar E, provided with the notched plates $d^2$ and $e'$, are secured together by the bolt $e^2$, by means of which the bar E may be adjusted to any required angle vertically on the arm D, and, when made fast by the bolt $e^2$, forms a rigid compound crank-arm.

Upon the side of the rear ends of the connecting-bars E are formed notched plates $e^3$, which engage with corresponding notched plates $f'$, formed upon the central part of one side of the upright bar F. The rear end of the bar E is secured to the central part of the bar F by the stud-pin $f^2$, which passes through the notched plates $e^3$ and $f'$ of said bars E and F, and is held fast by a nut screwed upon the pin $f^2$, as shown. The pin $f^2$ projects inward from the center of the bar F, and to its inner end is secured the front coupling-block, G′, of the inner central parallel rod, H′. The upper and lower ends of the upright bar F, at equidistances from the central stud, $f^2$, are provided with two side outward-projecting stud-pins, $f^3$, to which the coupling-blocks G G of the upper and lower parallel rods, H H, are secured. The stud-pins $f^3$ $f^3$, projecting horizontally from the ends of the bar F on one side, and the central stud-pin, $f^2$, projecting horizontally from the center of the bar F on the opposite side, are each provided with their respective coupling-blocks G G and G′. These coupling-blocks are made with a round hole in each to fit and turn freely on the studs $f^3$ $f^3$ $f^2$, and the rear end of each block is provided with a horizontal slit to receive and hold the front ends of the parallel rods H H H′, which are pivoted in the slotted ends of the coupling-blocks by the bolts or pins $g$ $g'$, as shown. Thus the three parallel bars H H and H′ are free to move laterally in the blocks G G G′ and vertically on the stud-pins $f^3$ $f^3$ $f^2$. The rear ends of the parallel rods H H H′ are also pivoted, in like manner, in the horizontal slots formed in the coupling-blocks I I I′, and the top and bottom coupling-blocks, I I, are also pivoted to the side projecting stud-pins, $j'$, which are secured to and project from the side at the top and bottom of the small rectangular frame J, while the rear end of the central parallel rod, H′, is pivoted to the block I′ and secured on the inner stud, $j^2$, which is secured to the central part of the inner side of said frame J.

It is obvious that the parallel rods H H H′, each having a double-jointed connection at each end with its respective stud-pin on the frame J and bar F, will have a free vertical and lateral movement, and the rods H H H′ will always be held parallel with each other; also, the bar F and frame J, whether the frame J or bar F be moved to the right or left or vertically, and the pitch of the plow-points will not be altered by any vertical or lateral adjustment of the parallel rods.

The pitch of the plows and the depth to which they work in the ground are regulated by adjusting the bars E and the crank-arms D, in connection with the upright bars F and the axle B. For instance, should it be desired to incline the plows more than as shown in Fig. 2, then, by loosening the nut on the stud-pin $f^2$ and adjusting the upper end of the vertical bar F backward, which will cause its lower end to move forward, owing to the central bar on the pin $f^2$, and securing the notched plates $e^2$ and $f'$ together again with the bar F in an inclined position, it is evident that the top and bottom parallel rods, H H, will cause the frame J also to assume an inclined position parallel with the bar F; and as the plow-arms K are attached permanently to said frame J, it is evident that the plows L will have a corresponding inclination, which inclination or pitch will not be altered by any vertical or lateral movement of the parallel rods.

The plows and the axle of the cultivator may be brought closer together by loosening the bolts $e^2$ and $f^2$ and turning the crank D up or forward, thus causing the connecting-rod E to draw the bar F closer to the axle B, where they may be made fast by securing the bolt $e^2$ and stud $f^2$ again in place.

The front plow-standards, K, are firmly secured to the frame J and project forward, the lower ends being provided with plow-shovels L in the usual manner. The rear plow-standards, K′, are also attached to the frame J and project backward, being also provided with shovels L, as usual.

The lower or bottom bar of the frame J and the upper parts of the plow-standards K K′ are provided with several holes to receive fastening-bolts for the purpose of adjusting the plows L wider apart or closer together, as may be required.

Upon the inner side bar of the frame J are formed radial notched plates $j^2$, the notches of which engage with corresponding notches in the plate M. The notched plate M is secured to the notched plate $j^2$ and to the bar of the frame J by a bolt, $m'$. The notched plate M is vertical, and upon the rear edge is formed a horizontal notched plate, M′, the notches of which engage with the notches of the notched plate $n'$, formed upon or attached to the end of the handle N. The handle N and its notched plate $n'$ are secured to the notched plate M′ by a bolt, $m^2$, by means of which the said handle may be adjusted laterally or vertically by loosening one or the other of the bolts $m^2$ $m'$, as may be required.

Having thus described my invention, what I claim as new, and desire to secure by Letters Patent, is—

1. The combination of the set of three parallel bars, H, provided with double-jointed couplings G I at the ends of each bar, with the frame J, to which the plow-standards K are attached, and with the bars F E and crank D, by which they are connected with the axle B, substantially as herein shown and described.

2. The combination of the notched plates $d^2$ $e'$ and $e^3$ $f'$ and their bolts $e^2$ $f^2$ with the connecting-bar E, the crank-arm D, attached to the axle B, and the bar F, with which the forward ends of the parallel bars H are connected, substantially as herein shown and described.

3. The combination of the double-notched plate M M′ and the notched plates $j^2$ and $n'$ and their bolts $m'$ $m^2$ with the handle N and the frame J, to which the plow-standards K are attached, and with which the rear ends of the parallel bars H are connected, substantially as herein shown and described.

4. The parallel rods H H H′, having pivotal bearings at each end, and pivoted to the coupling-blocks G G G′ I I I′, combined with the plow-frame J and bar F, with side projecting studs $f^3$ $f^3$ $f^2$ $j'$ $j'$ $j^3$, as and for the purpose specified.

5. The combination, in a cultivator, of the plows L, a laterally and vertically adjustable frame, J, to which the plows are attached, the upright F, and the parallel rods having double-jointed couplings at each end and connecting said frame J and upright F, as and for the purpose specified.

6. In a cultivator, the frame J, in combination with the parallel rods having double-jointed couplings at each end, and attached thereto, whereby the frame may be adjusted vertically and laterally without changing its vertical position to that of an inclined one, substantially as shown and described.

7. In a cultivator, the frame J, with stud-pins $j'$ $j'$ projecting from one side at the top and bottom of said frame, and also having a stud-pin, $j^3$, projecting from its opposite side midway between the other two studs, combined with the coupling-blocks I I I′, the parallel rods H H H′, the coupling-blocks G G G′, and corresponding stud-pins $f^2$ $f^3$ $f^2$ on the upright F, as and for the purpose specified.

8. In a cultivator, the combination of the upright F, having parallel rods H secured thereto by double-hinge joints operating at right angles to each other, the notched plate $f'$, and the crank-connection E, with notched plate $e^2$, substantially as shown and described.

9. The compound crank-arm composed of the crank D, with notched side plate, $d^2$, and the connecting-rod E, with notched side plates at each end, as at $e'$ $e^3$, combined with the bar F and axle B, as and for the purpose specified.

In testimony whereof I have signed my name to this specification in the presence of two subscribing witnesses.

DANIEL UNTHANK.

Witnesses:
E. O. FRINK,
G. H. RENNETT.